United States Patent
Krampert et al.

(10) Patent No.: US 9,417,138 B2
(45) Date of Patent: Aug. 16, 2016

(54) GAS COUPLED PROBE FOR SUBSTRATE TEMPERATURE MEASUREMENT

(71) Applicant: Varian Semiconductor Equipment Associates, Inc., Gloucester, MA (US)

(72) Inventors: Jeffrey E. Krampert, Topsfield, MA (US); Roger B. Fish, Bedford, MA (US)

(73) Assignee: Varian Semiconductor Equipment Associates, Inc., Gloucester, MA (US)

( * ) Notice: Subject to any disclaimer, the term of this patent is extended or adjusted under 35 U.S.C. 154(b) by 466 days.

(21) Appl. No.: 14/022,682

(22) Filed: Sep. 10, 2013

(65) Prior Publication Data

US 2015/0071327 A1 Mar. 12, 2015

(51) Int. Cl.
*G01K 13/00* (2006.01)
*G01K 1/14* (2006.01)

(52) U.S. Cl.
CPC .............. *G01K 13/00* (2013.01); *G01K 1/143* (2013.01)

(58) Field of Classification Search
CPC ......... G01K 13/00; G01K 1/14; G01K 1/143; G01K 1/146
See application file for complete search history.

(56) References Cited

U.S. PATENT DOCUMENTS

| | | | |
|---|---|---|---|
| 5,507,499 A * | 4/1996 | Davenport ............ | C23C 14/541 228/124.6 |
| 2003/0112848 A1 | 6/2003 | Khan | |
| 2003/0206573 A1 | 11/2003 | Gotthold et al. | |
| 2004/0258130 A1 * | 12/2004 | Gotthold ............ | G01K 11/3213 374/208 |
| 2006/0141806 A1 * | 6/2006 | Waldfried ............. | H01L 21/312 438/778 |
| 2006/0275933 A1 * | 12/2006 | Du Bois ................. | G01K 1/143 438/14 |
| 2008/0317093 A1 | 12/2008 | Mau et al. | |
| 2009/0022205 A1 * | 1/2009 | Comendant ............. | G01K 1/16 374/161 |
| 2010/0135357 A1 * | 6/2010 | Chancy ................ | G01B 5/0014 374/179 |

FOREIGN PATENT DOCUMENTS

JP 2002-043381 A 2/2002
KR 10-1998-0043531 A 9/1998

OTHER PUBLICATIONS

A. Cardoso, et al., Improvements in wafer temperature measurements, Journal of Vacuum Science Technology B, Mar./Apr. 2001, pp. 397-402, vol. 19, Issue 2, American Vacuum Society.
International Search Report and Written Opinion Mailed Dec. 19, 2014 for PCT/US2014/054487 Filed Sep. 8, 2014.

* cited by examiner

*Primary Examiner* — Lisa Caputo
*Assistant Examiner* — Philip Cotey

(57) ABSTRACT

A low pressure temperature sensor for measuring the temperature of a substrate during semiconductor device manufacturing is generally described. Various embodiments describe a gas chamber having an opening disposed within a dielectric plate of a platen with a seal disposed around the opening in the gas chamber such that the opening in the gas chamber may be sealed against the substrate. Furthermore, a temperature sensor and a spring are disposed in the gas chamber, the spring biased to place the temperature sensor in contact with the substrate. Additionally, a gas source configured to pressurize the gas chamber with a low pressure gas in order to increase thermal conductivity between the substrate and the temperature sensor is provided.

20 Claims, 8 Drawing Sheets

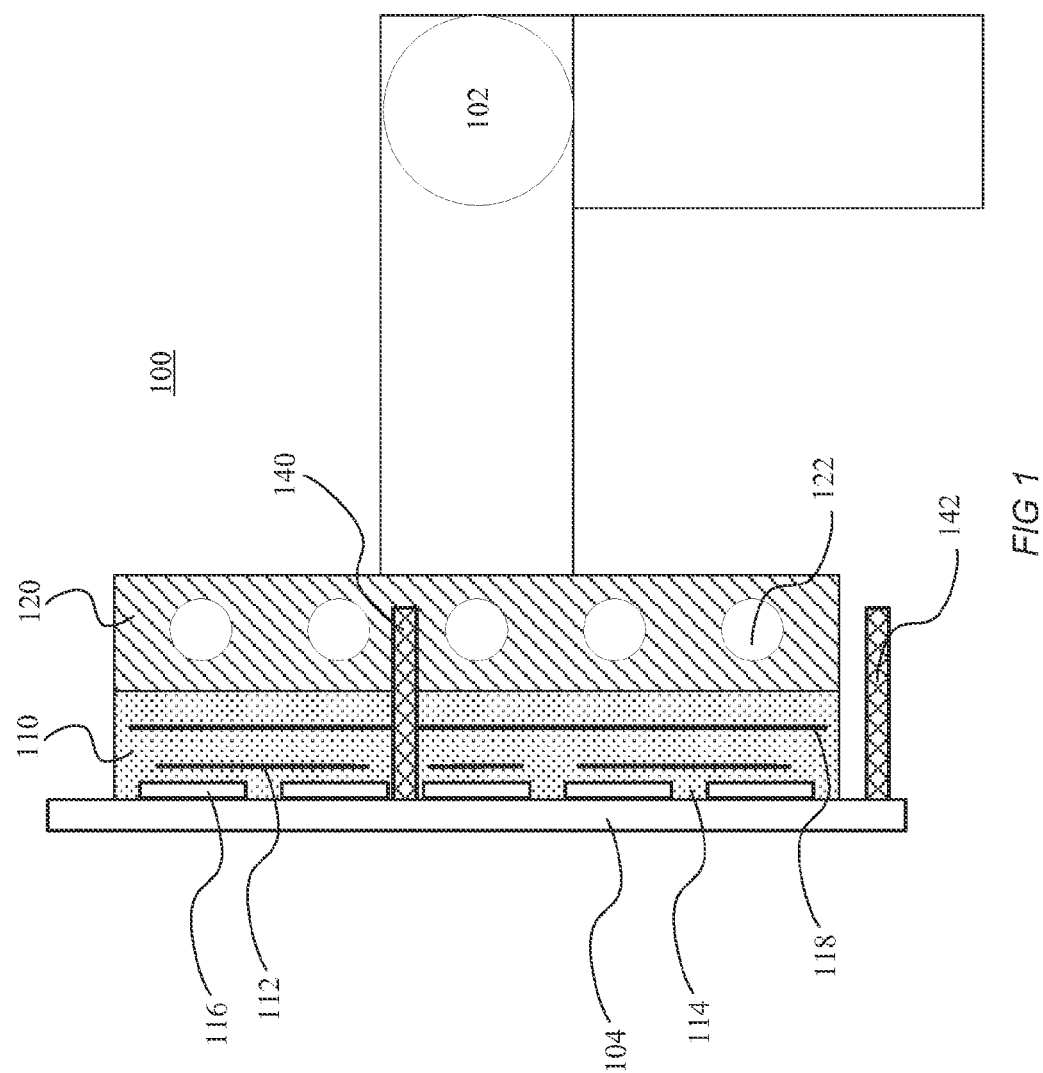

GAS COUPLED PROBE FOR SUBSTRATE TEMPERATURE MEASUREMENT

FIELD OF THE DISCLOSURE

Embodiments of the present disclosure generally relate to the field of substrate processing, and more particularly to measuring the temperature of substrates during semiconductor device manufacturing.

BACKGROUND OF THE DISCLOSURE

Semiconductor devices are typically manufactured using a multi-step process wherein the semiconductor device is gradually created on a substrate, such as, a semiconductor wafer. During various steps of the manufacturing process, it is desirable to control the temperature of the substrate. For example, during the manufacturing process, ions may be implanted within substrate (sometimes referred to as doping) for the purpose of altering the type and level of conductivity of the substrate. A precise doping profile in an integrated circuit (IC) substrate and its thin-film structure is often crucial for proper IC performance. To achieve a desired doping profile, one or more ion species may be implanted in different doses and at different energies. The implant dose and effective energy of implantation may be affected by the temperature of the substrate during the implantation process. In fact, some ion implant processes are designed to be carried out while the temperature of the substrate is elevated relative to room temperature. Alternatively, some ion implant processes are designed to be carried out while the temperature of the substrate is reduced relative to room temperature.

As will be appreciated, the precise temperature of the substrate affects the results of the ion implant process. Thus, there is a need to measure the substrate temperature during semiconductor manufacturing in order to provide better control of the manufacturing process.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

In general, various embodiments of the present disclosure provide a gas coupled temperature probe for measuring the temperature of a substrate during a semiconductor manufacturing process. Example temperature probes include a temperature sensor for measuring the temperature of a substrate, a gas chamber having an opening, the gas chamber disposed around the temperature sensor, a seal disposed around the opening in the gas chamber, the seal configured to seal the opening in the gas chamber against the substrate, and a spring disposed within the gas chamber, the spring biased to place the temperature sensor in contact with the substrate.

As an alternative example, some embodiments disclose a platen for supporting a substrate during a semiconductor manufacturing processing comprising a dielectric plate for supporting a substrate, a temperature probe disposed in the dielectric plate for measuring the temperature of the substrate, the temperature probe comprising a temperature sensor for measuring the temperature of a substrate, a gas chamber having an opening, the gas chamber disposed around the temperature sensor, a seal disposed around the opening in the gas chamber, the seal configured to seal the opening in the gas chamber against the substrate, and a spring disposed within the gas chamber, the spring biased to place the temperature sensor in contact with the substrate.

Another example, some embodiments disclose a temperature probe for measuring the temperature of a substrate during a semiconductor manufacturing processing comprising a gas chamber having an opening disposed within a dielectric plate of a platen, the platen configured to support a substrate, a temperature sensor for measuring the temperature of the substrate, a temperature sensor contact in thermal contact with the temperature sensor, a gas chamber having an opening, the gas chamber disposed around the temperature sensor, a seal disposed around the opening in the gas chamber, the seal configured to seal the opening in the gas chamber against the substrate, and a spring disposed within the gas chamber, the spring biased place the temperature sensor contact in contact with the substrate.

BRIEF DESCRIPTION OF THE DRAWINGS

By way of example, various embodiments of the disclosed device will now be described, with reference to the accompanying drawings, in which:

FIG. 1 is a block diagram of an exemplary platen for a semiconductor manufacturing apparatus;

DETAILED DESCRIPTION

Figure 2A:
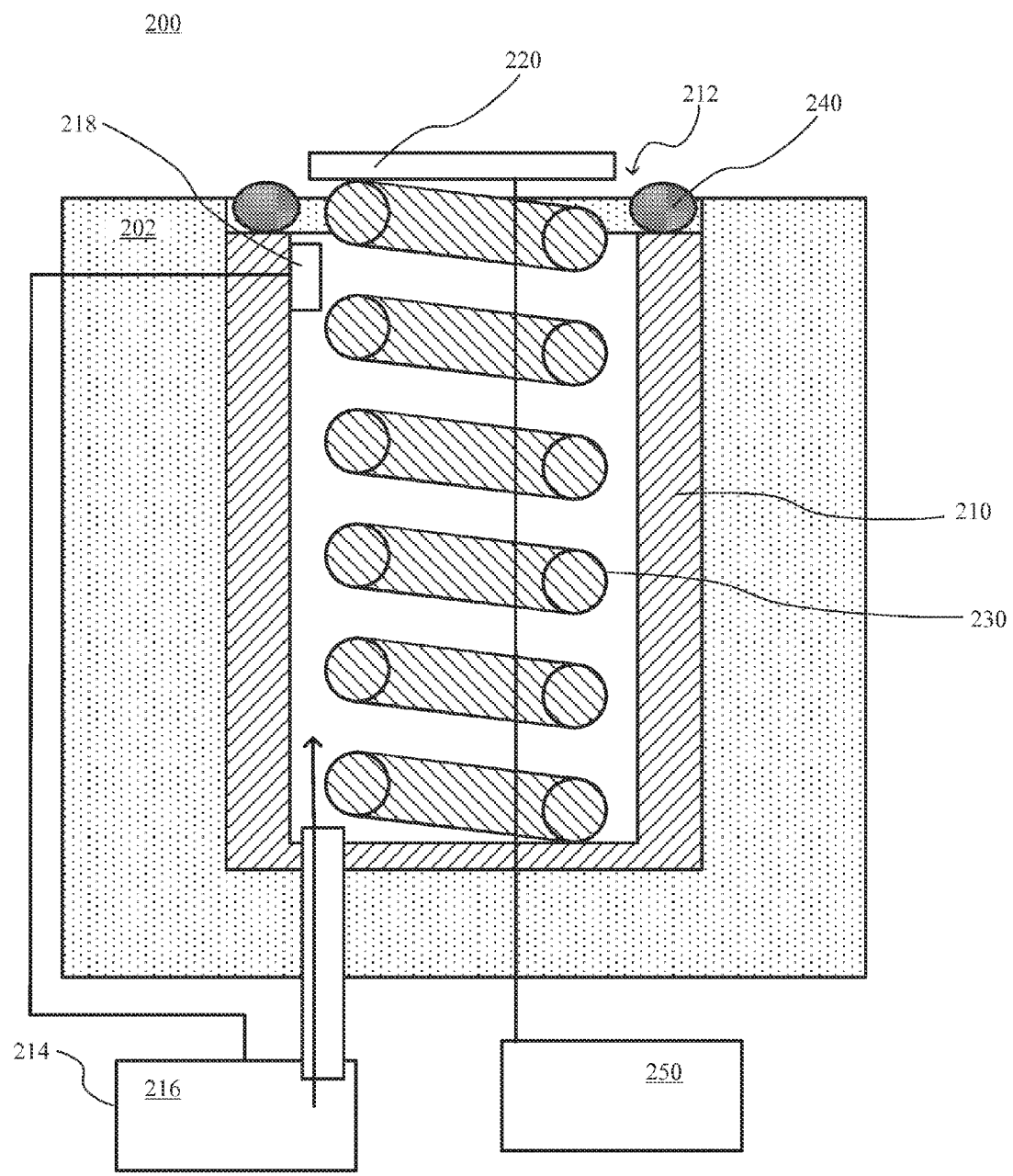
FIGS. 2A-2B are block diagrams of an example temperature sensor.

Embodiments of the present disclosure may provide for measuring the temperature of a substrate during a semiconductor device manufacturing process. As will be appreciated, semiconductor devices are manufactured by forming the device structure in and on a substrate, such as, for example, a semiconductor wafer. During the manufacturing process, the substrate is often supported on a platen. The platen facilitates exposing the substrate to the various processing steps. FIG. 1 illustrates a block diagram showing a cut-away view of an example platen 100, arranged according to various embodiments of the present disclosure. As will be appreciated, the platen 100 may be incorporated into a larger apparatus for manufacturing semiconductor devices (e.g., ion implant apparatus, plasma chamber, or the like) where measuring the temperature of the substrate being processed is desirable.

As depicted, the platen 100 may be coupled to a scanner mechanism 102 that facilitates various movements of the platen 100. The platen 100 may comprise a dielectric plate 110 and an interface plate 120. The dielectric plate 110 may have electrodes 112 embedded therein to apply an electrostatic force to hold a substrate 104 (e.g., semiconductor wafer, or the like) onto a surface of the dielectric plate 110. The surface of the dielectric plate 110 may either be smooth or contain mesa structures 114 to reduce backside contact to the substrate 104 and to reduce backside particles. An interface 116 formed between the substrate 104 and the dielectric plate 110 may contain a backside gas to improve or adjust thermal contact there between.

One or more heating elements 118 may be embedded in the dielectric plate 110 to heat up and maintained the temperature of the dielectric plate 110 at a desired temperature. During operation, when the substrate 104 is to be heated for example, the heating elements 118 may be activated, which will cause the temperature of the substrate 104 to increase due to the thermal contact with the dielectric plate 110. The interface plate 120 may include cooling passages 122, in which a cooling fluid may be passed to cool the platen 100. During operation, when the substrate 104 is to be cooled for example, cooling fluid may be passed through the cooling passages, which will cause the temperature of the dielectric plate 110 and also the substrate 104 to decrease due to thermal contact with the interface plate.

As will be appreciated, during operation, it is advantageous to observe the temperature of the substrate 104. Accordingly, the platen 100 may include one or more temperature probes. For example, the platen 100 is shown including the temperature probes 140 and 142. Various examples of the temperature probes 140 and 142 will be provides below with respect to FIGS. 2-6. In some examples, a temperature probe (e.g., the temperature probe 140) may be disposed within the dielectric plate 110 adjacent to the surface upon which a substrate is held. Accordingly, when the substrate 104 is disposed on the platen 100, the temperature probe 140 may be adjacent to and in contact with the substrate 104 for measuring the temperature of the substrate. Additionally, a temperature probe (e.g., the temperature probe 142) may be disposed adjacent to a portion of the substrate 104 that extends beyond the dielectric plate 110.

It is to be appreciated, that the quantity of temperature probes shown in FIG. 1 is done for clarity of presentation. In practice, any number of temperature probes (e.g., more of less than shown in FIG. 1) may be provided. For example, it may be desirable to embed a number of temperature probes 140 in the dielectric plate 110 for purposes of measuring the temperature of the substrate 104 at various different locations.

Figure 2B:
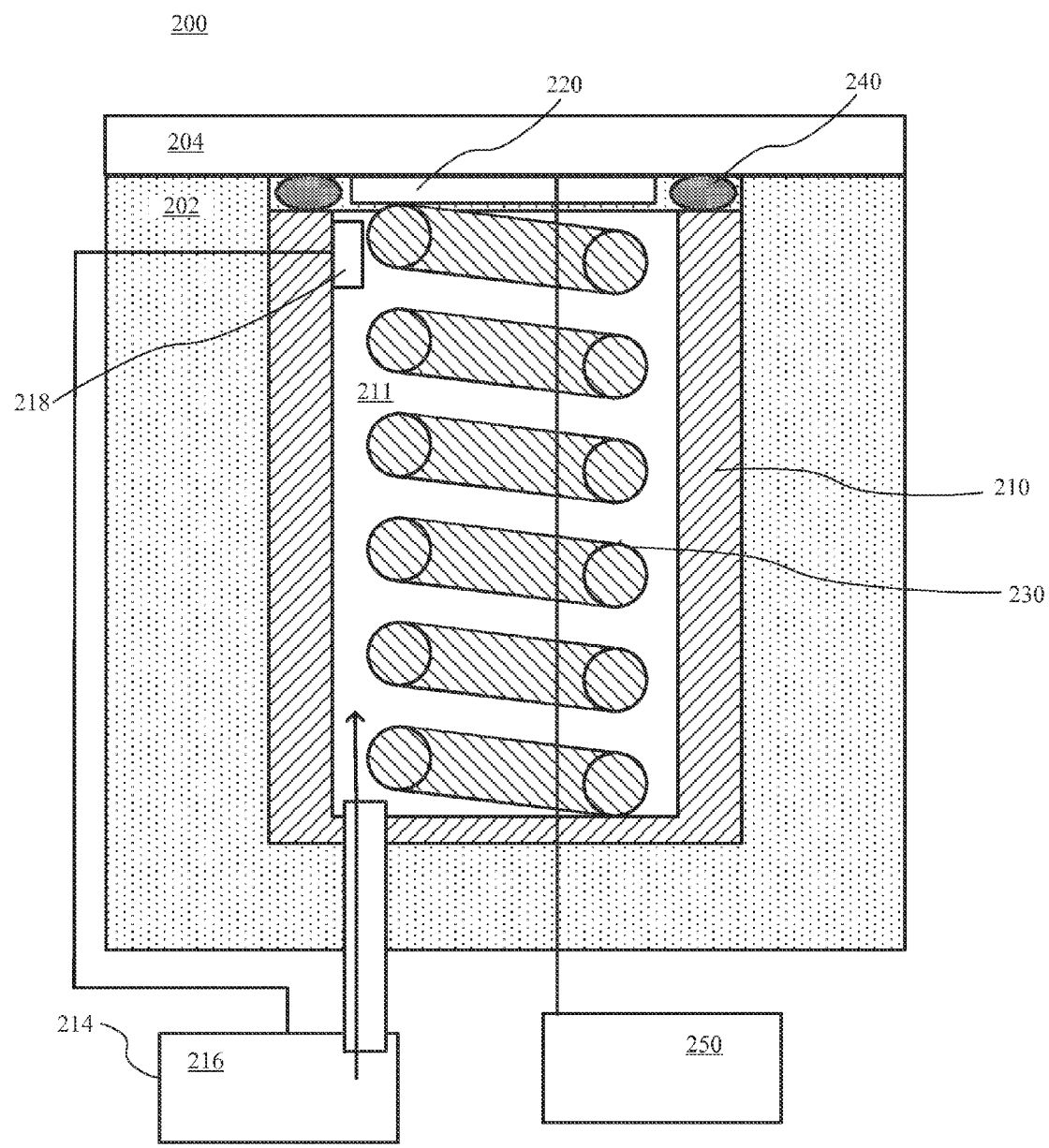

FIGS. 2A-2B illustrates block diagrams showing a cut-away view of an example temperature probe 200. As depicted, the temperature probe 200 is disposed within a dielectric plate 202 of a platen. In general, FIG. 2A illustrates the temperature probe prior to making contact with a substrate while FIG. 2B illustrates the temperature probe after a substrate 204 has been disposed on the dielectric plate 202. As will be appreciated, in some embodiments, the temperature probe 200 may be implemented in the platen 100 of FIG. 1 as the temperature probe 140. The temperature probe 200 includes a gas chamber 210 having an opening 212 therein. In some examples, the gas chamber 210 is made of a ceramic material. In further examples, the gas chamber 210 is made of a ceramic material having low electrical and thermal conductivity. The gas chamber 210 is disposed within the dielectric plate 202, with the opening 212 exposed to the surface of the dielectric plate 202 upon which the substrate 204 (shown in FIG. 2B) may be attached.

The gas chamber 210 includes a gas source 214 configured to pressurize the gas chamber 210 with a gas 216, which will be described in greater detail below. In some examples, the gas 216 may be a noble gas, such as, for example, Nitrogen. Other gases might include Helium or Argon. With some examples, the gas source 214 may be configured to pressurize the gas chamber 210 to a low pressure (e.g., between 2 and 20 Torr.) In some examples, the pressure in the gas chamber 210 may be between 8 and 10 Torr. In order to maintain this low pressure, the gas source 214 may be configured to use vacuum to reduce the pressure in the gas chamber 210. The pressure within the chamber may be monitored and/or adjusted based on a pressure sensor 218, which may be coupled to the gas source 214. In some examples, the temperature probe 200 may be disposed within a process chamber of an ion implant apparatus. As will be appreciated, during ion implantation, the process chamber is at some level of vacuum. In some examples, the gas source 214 may be configured to pressurize the gas chamber 210 to a pressure higher relative to the pressure in the process chamber of the ion implant apparatus.

The temperature probe 200 also includes a temperature sensor 220, disposed within the gas chamber adjacent to the opening 212 and the top surface of the dielectric plate 202 (e.g., the surface configured to support the substrate 204). In some examples, the temperature sensor 220 may be a thermocouple (TC), a resistive temperature device (RTD), or another device capable of measuring temperature including but not limited to Thermistors or Semiconductor based sensors. The temperature sensor 220 is electrically coupled to a temperature sensor module 250 configured to initiate and/or operate the temperature sensor 220.

A spring 230 is disposed in the gas chamber 210 and biased to press the temperature sensor 220 towards the top surface of the dielectric plate 202 such that when the substrate 204 is placed on the dielectric plate 202, the temperature sensor 220 may make contact with the substrate 204 (e.g., as illustrated in FIG. 2B.) A seal 240 is disposed around opening 212 in the gas chamber 210. The seal 240 is configured such that when the substrate 204 is disposed on the dielectric plate 202, the internal cavity (e.g., internal cavity 211 shown in FIG. 2B) of the gas chamber 210 will be sealed against the lower surface of the substrate 204 via the seal 240. In some examples, the seal 240 may be an O-ring. In further examples, the seal 240 may be made of a material (e.g., silicon, gas filled metal O-ring, or the like) that is able to withstand the temperature to which the dielectric plate 202 may be heated or cooled during operation.

Turning more specifically to FIG. 2B, the substrate 204 is shown disposed on the dielectric plate 202. Due to the biasing of the spring 230, the temperature sensor 220 is shown making contact with the lower surface of the substrate 204. Furthermore, the seal 240 seals the gas chamber against the substrate 240, forming inner cavity 211. As such, the gas source 214 may pressurize the inner cavity 211 of the gas chamber 210 with the gas 216.

During operation, when the inner cavity 211 of the gas chamber 210 is pressurized, heat conduction may be increased between the temperature sensor 220 and the substrate 204 due to the pressure in the gas chamber 210. In some examples, the relatively low pressure in the gas chamber 210 may increase thermal conduction between the temperature sensor 220 and the substrate 204. Thus, determining the temperature of the substrate may be facilitated. Furthermore, as described above, some dielectric plates (e.g., the dielectric plate 110 of FIG. 1) are actively heated or cooled. The gas chamber 210 may act as a temperature shield between the temperature sensor 220 and the dielectric plate 202. As such, the temperature sensor 220 may be able to more accurately measure the temperature of the substrate 204 without being unduly affected by the temperature of the dielectric plate 202.

Figure 3A:
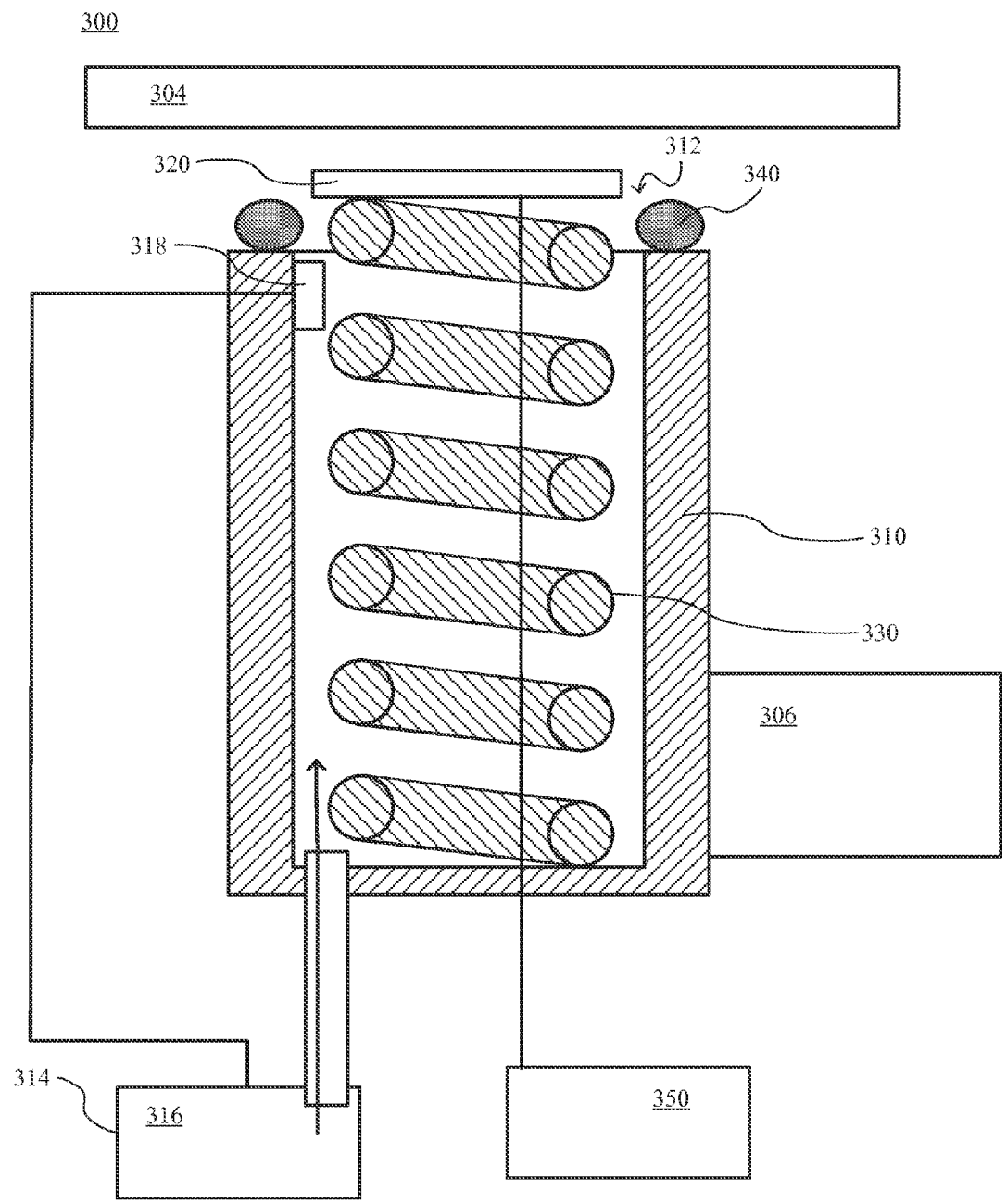
FIGS. 3A-3B are block diagrams of another example temperature sensor.
Figure 3B:
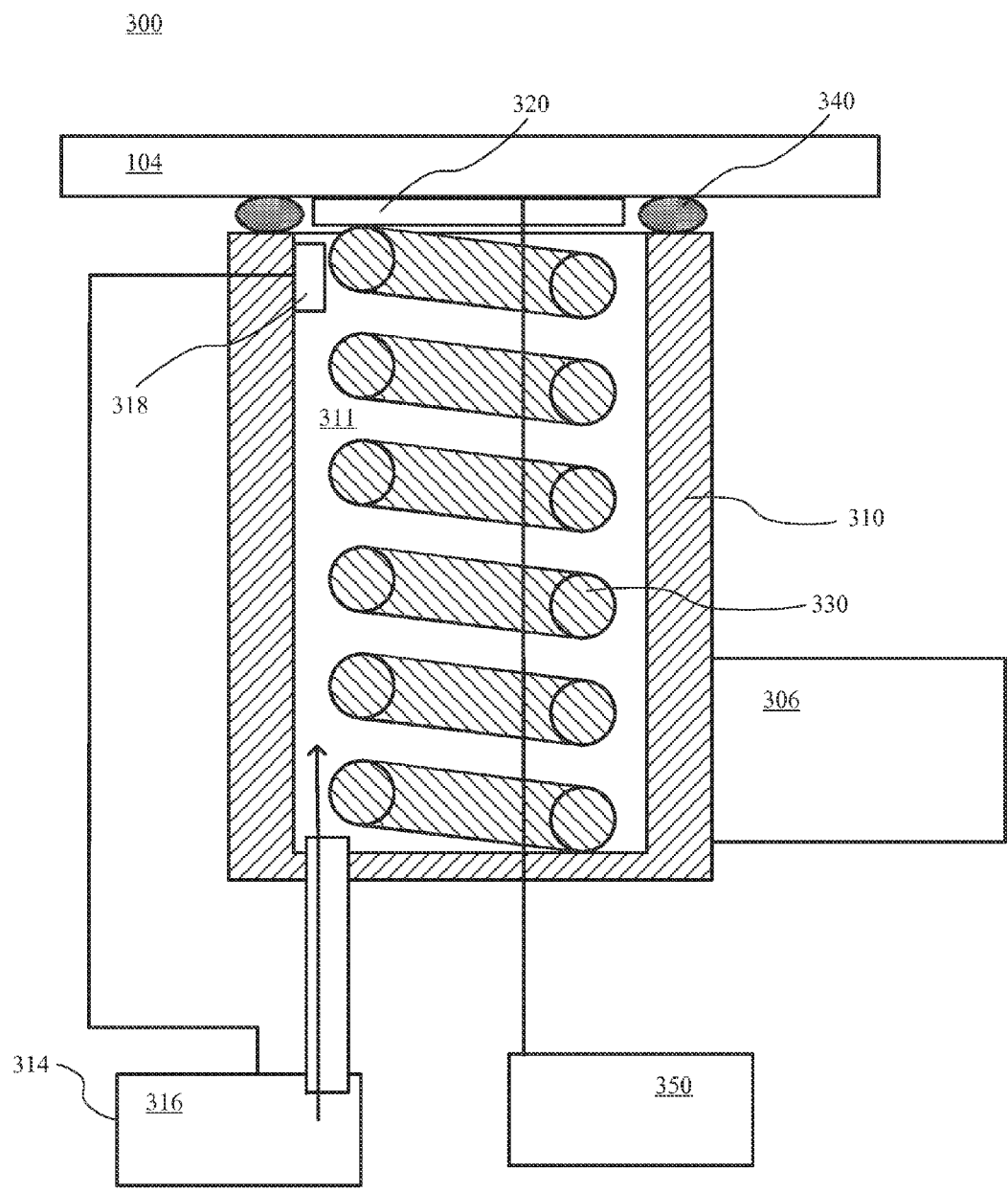

FIGS. 3A-3B illustrates block diagrams showing a cut-away view of an example temperature probe 300. As depicted, the temperature probe 300 is not disposed within a dielectric plate. As will be appreciated, in some embodiments, the temperature probe 300 may be implemented in the platen 100 of FIG. 1 as the temperature probe 142. In general, FIG. 3A illustrates the temperature probe prior to making contact with the substrate 304 while FIG. 3B illustrates the temperature probe after making contact with the substrate 304.

The temperature probe 300 includes a movement controller 306 configured to move the temperature probe away from and towards the substrate 304. More specifically, the movement controller 306 may move the temperature probe towards the substrate 304 such that the temperature probe is positioned so as to measure the temperature of the substrate 304, as show in FIG. 3B. Accordingly, during practice, when temperature measurement(s) of the substrate 304 are desired, the movement controller 306 may position the temperature probe 300 against the substrate 304, as depicted in FIG. 3B.

Turning more specifically to FIG. 3A, the temperature probe 300 includes a gas chamber 310 having an opening 312 therein. In some examples, the gas chamber 310 is made of a ceramic material. In further examples, the gas chamber 310 is made of a ceramic material having low electrical and thermal conductivity. The gas chamber 310 includes a gas source 314 configured to pressurize the gas chamber 310 with a gas 316, which will be described in greater detail below. In some examples, the gas 316 may be a noble gas, such as, for example, argon. With some examples, the gas source 314 may be configured to pressurize the gas chamber 310 to a low pressure (e.g., between 2 and 20 Torr, between 8 and 10 Torr, or the like.) In order to maintain this low pressure, the gas source 314 may be configured to use vacuum to reduce the pressure in the gas chamber 310. The pressure within the chamber may be monitored and/or adjusted based on a pressure sensor 318, which may be coupled to the gas source 314. In some examples, the temperature probe 300 may be disposed within a process chamber of an ion implant apparatus. As will be appreciated, during ion implantation, the process chamber is at some level of vacuum. In some examples, the gas source 314 may be configured to pressurize the gas chamber 310 to a low pressure relative to the pressure in the process chamber of the ion implant apparatus.

The temperature probe 300 also includes a temperature sensor 320. In some examples, the temperature sensor 320 may be a thermocouple, a resistive temperature device, or another device capable of measuring temperature. The temperature sensor 320 is electrically coupled to a temperature sensor module 350 configured to initiate and/or operate the temperature sensor 320.

A spring 330 is disposed in the gas chamber 310 and biased to press the temperature sensor 320 towards the top surface of the gas chamber 310 such that when the temperature probe 300 is moved adjacent to the substrate 304, the temperature sensor 320 may make contact with the substrate 304 (e.g., as illustrated in FIG. 3B.) A seal 340 is disposed around opening 312 in the gas chamber 310. The seal 340 is configured such that when the temperature probe 300 is moved adjacent to the substrate 304, the internal cavity (e.g., internal cavity 311 shown in FIG. 3B) of the gas chamber 310 will be sealed against the lower surface of the substrate 304 via the seal 340. In some examples, the seal 340 may be an O-ring. In further examples, the seal 340 may be made of a material (e.g., silicon, gas filled metal O-ring, or the like) that is able to withstand the temperature to which the substrate 304 may be heated or cooled during operation.

Turning more specifically to FIG. 3B, the temperature probe 300 is shown moved adjacent to the substrate 304. Due to the biasing of the spring 330, the temperature sensor 320 is shown making contact with the lower surface of the substrate 304. Furthermore, the seal 340 seals the gas chamber against the substrate 340, forming inner cavity 311. As such, the gas source 314 may pressurize the inner cavity 311 of the gas chamber 310 with the gas 316.

During operation, when the inner cavity 311 of the gas chamber 310 is pressurized, heat conduction may be increased between the temperature sensor 320 and the substrate 304 due to the pressure in the gas chamber 310. In some examples, the relatively low pressure in the gas chamber 310 may increase thermal conduction between the temperature sensor 320 and the substrate 304. Thus, determining the temperature of the substrate 304 may be facilitated. Furthermore, as described above, the temperature probe 300 may be disposed within a process chamber of an ion implant apparatus. As will be appreciated, the low pressure within the process chamber may interfere with heat conduction between the substrate 304 and the temperature sensor 320. However, due to the gas inside the inner cavity 311, the temperature sensor 320 may be able to more accurately measure the temperature of the substrate 304 without being unduly affected by the low pressure within the process chamber of the ion implant apparatus.

Figure 4:
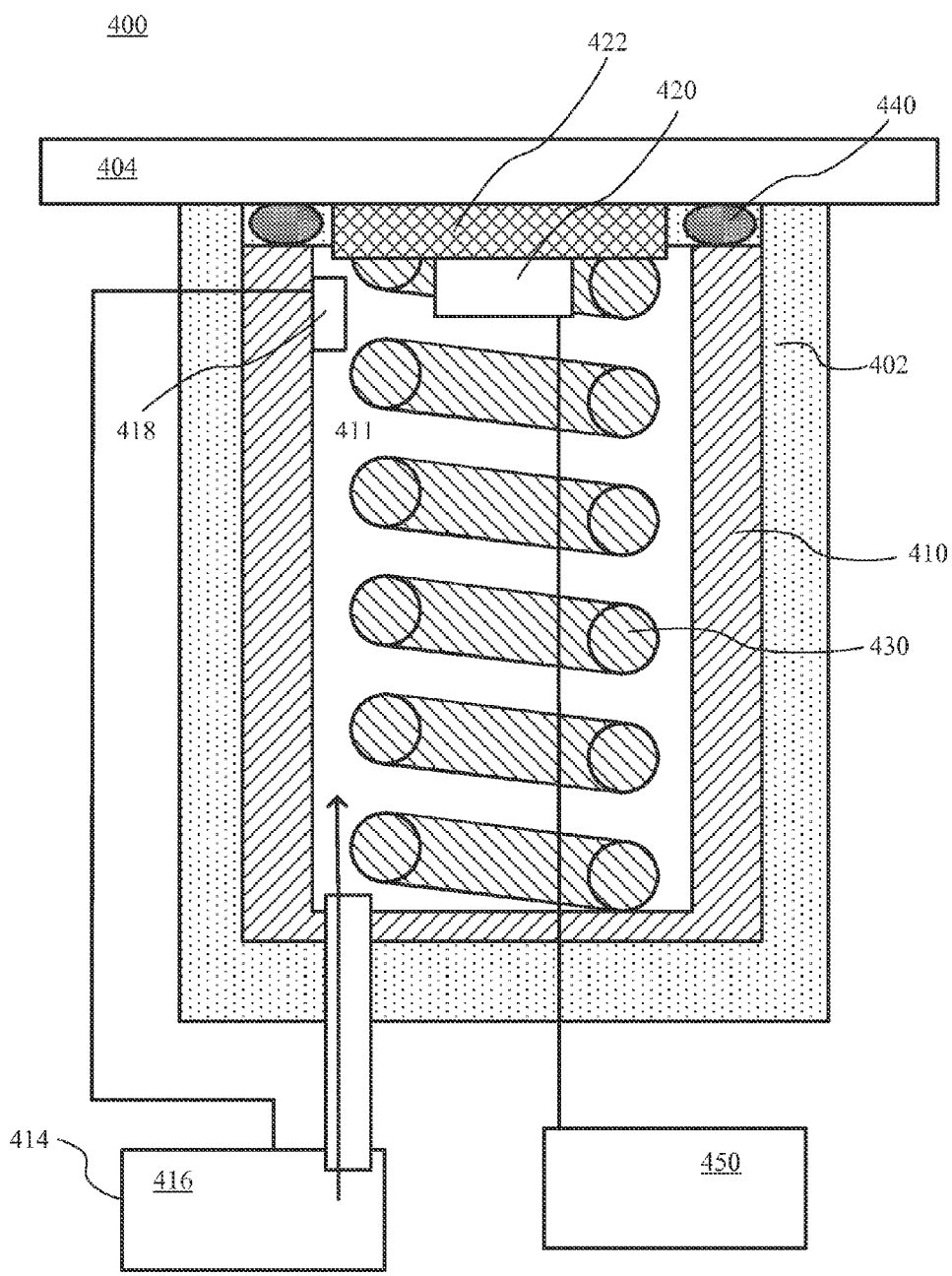
FIG. 4 is a block diagram of another alternative example of a temperature probe.
Figure 5:
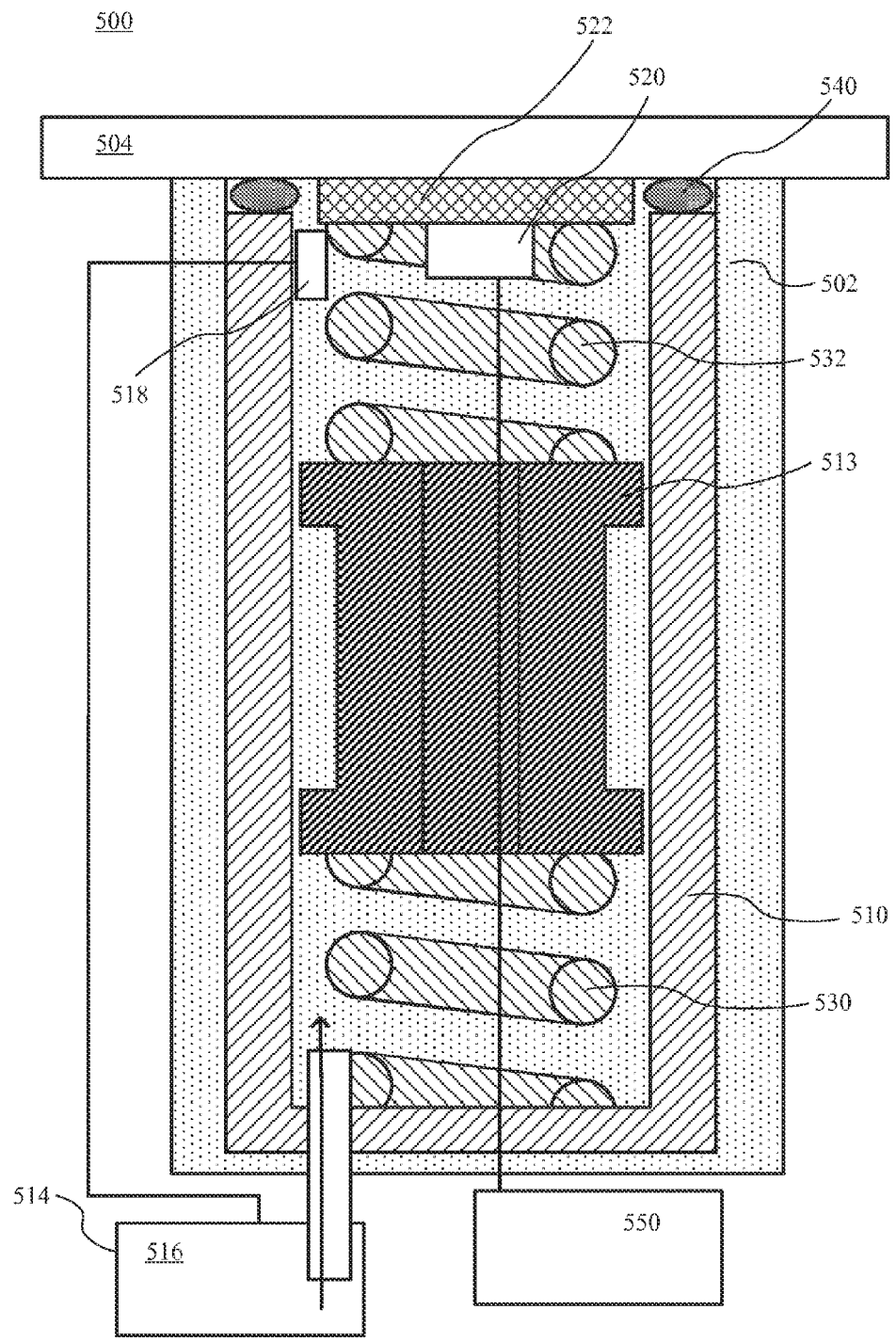
FIG. 5 is a block diagram of still another example of a temperature probe.
Figure 6:
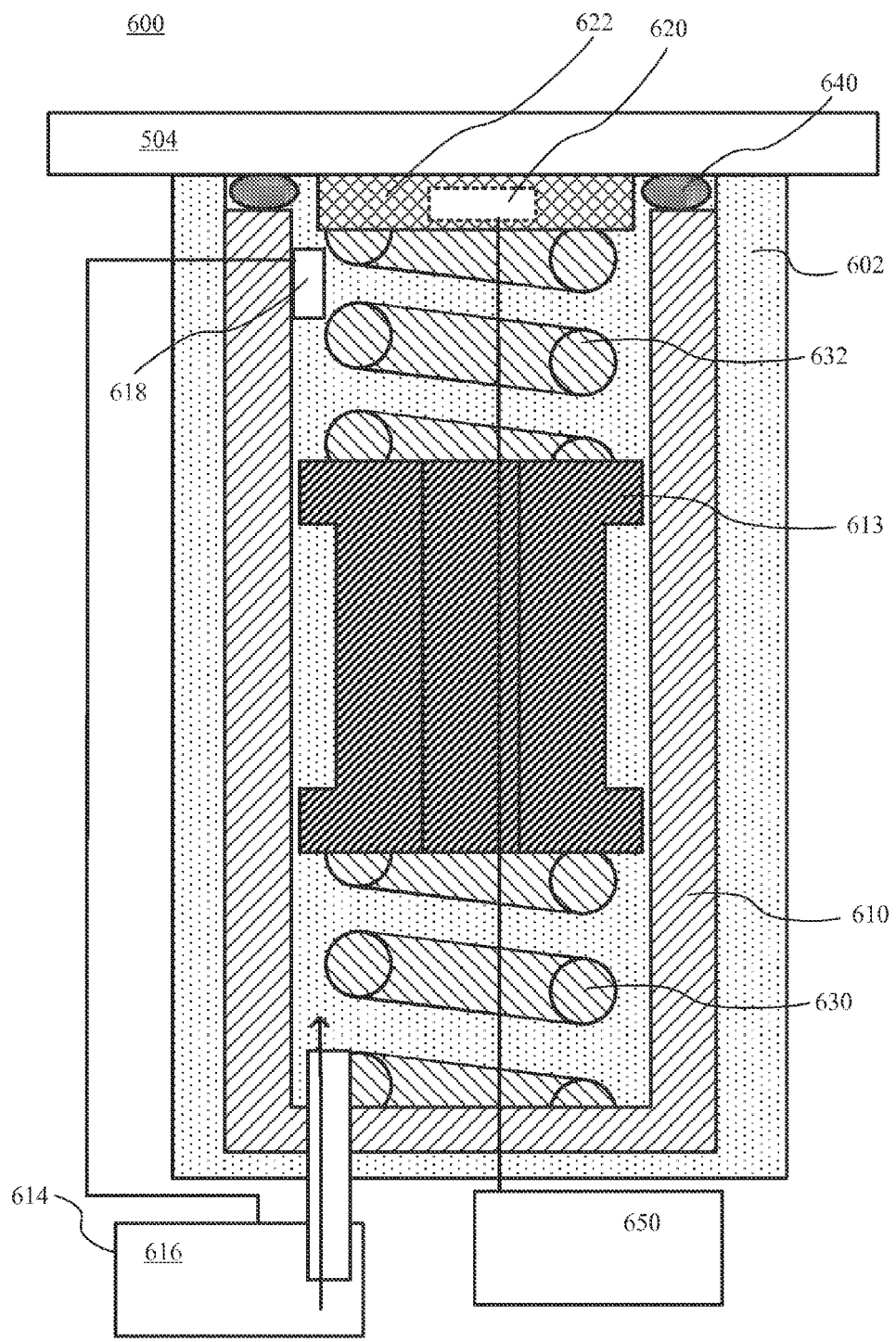
FIG. 6 is a block diagram of still another alternative example of a temperature probe, all arranged in accordance with embodiments of the present disclosure.

FIGS. 4-6 illustrate block diagrams showing cut-away views of example temperature probes 400, 500, and 600 respectively. It is to be appreciated, that although the temperature probes 400, 500, and 600 are depicted disposed within a dielectric plate (e.g., 402, 502, and 602) they may be configured similar to the temperature probe 300. More specifically, one or more of the temperature probes 400, 500, or 600 may not be disposed within a dielectric plate, but instead may be configured to be moved adjacent to a substrate during operation so that the temperature of the substrate may be measured (e.g., as described with respect to FIGS. 3A-3B.)

Furthermore, it is to be appreciated, FIGS. 4-6 only shown the temperature probes 400, 500, and 600 after they have made contact with a substrate. However, companion arrangements (e.g., as shown in FIG. 2A-2B or 3A-3B) are envisioned. Turning more specifically to FIG. 4, temperature probe 400 includes a gas chamber 410 having a gas source 414 configured to pressurize the gas chamber 410 with a gas 416. In some examples, the gas 416 may be a noble gas, such as, for example, argon. With some examples, the gas source 414 may be configured to pressurize the gas chamber 410 to a low pressure (e.g., between 2 and 20 Torr, between 8 and 10 Torr, or the like.) In order to maintain this low pressure, the gas source 414 may be configured to use vacuum to reduce the pressure in the gas chamber 410. The pressure within the chamber may be monitored and/or adjusted based on a pressure sensor 418, which may be coupled to the gas source 414. In some examples, the temperature probe 400 may be disposed within a pressure chamber of an ion implant apparatus. As will be appreciated, during ion implantation, the process chamber is at some level of vacuum. In some examples, the gas source 414 may be configured to pressurize the gas chamber 410 to a low pressure relative to the pressure in the process chamber of the ion implant apparatus.

The temperature probe 400 also includes a temperature sensor 420 and a temperature sensor contact 422, disposed within the gas chamber and adjacent to the top surface of the dielectric plate 402. In some examples, the temperature sensor 420 may be a thermocouple, a resistive temperature device, or another device capable of measuring temperature. The temperature sensor 420 is electrically coupled to a temperature sensor module 450 configured to initiate and/or operate the temperature sensor 420. As will be appreciated, in some examples, the temperature sensor 420 may be small in size and unsuitable for making adequate thermal contact with the substrate 404. As such, the temperature sensor 420 may be attached (e.g., glued, bonded, soldered, or the like) to the temperate sensor contact 422. The temperature sensor contact 422 may be configured to have sufficient surface area so as to create a thermal contact point for the substrate 404. In some examples, the temperature sensor contact 422 may be made from a material having sufficiently high thermal conduction properties (e.g., aluminum, alumina, zirconia, or the like). Accordingly, as illustrated, the temperature sensor 420 is disposed on a first surface of the temperature sensor contact 422, while a second surface of the temperature sensor contact, which is opposite the first surface, is configured to make contact with the substrate 404.

A spring 430 is disposed in the gas chamber 410 and biased to press the temperature sensor contact 422 (and consequently, the temperature sensor 420) towards the top surface of the dielectric plate 402 such that when the substrate 404 is placed on the dielectric plate 402 the temperature sensor contact 422 makes contact with the substrate 404. A seal 440 is disposed around opening 412 in the gas chamber 410. The seal 440 is configured such that when the substrate 404 is disposed on the dielectric plate 402, the internal cavity 411 of the gas chamber 410 will be sealed against the lower surface of the substrate 404 via the seal 440. In some examples, the seal 440 may be an O-ring. In further examples, the seal 440 may be made of a material (e.g., silicon, gas filled metal O-ring, or the like) that is able to withstand the temperature to which the dielectric plate 402 may be heated or cooled during operation.

As described above, due to the low pressure region formed in the inner cavity increased thermal condition between the substrate 404 and the temperature sensor 420, via the temperature sensor contact 422, may result.

Turning now to FIG. 5, the temperature probe 500 includes a gas chamber 510 having a gas source 514 configured to pressurize the gas chamber 510 with a gas 516. In some examples, the gas 516 may be a noble gas, such as, for example, argon. With some examples, the gas source 514 may be configured to pressurize the gas chamber 510 to a low pressure (e.g., between 2 and 20 Torr, between 8 and 10 Torr, or the like.) In order to maintain this low pressure, the gas source 514 may be configured to use vacuum to reduce the pressure in the gas chamber 510. The pressure within the chamber may be monitored and/or adjusted based on a pressure sensor 518, which may be coupled to the gas source 514. In some examples, the temperature probe 500 may be disposed within a pressure chamber of an ion implant apparatus. As will be appreciated, during ion implantation, the process chamber is at some level of vacuum, such as, 2.0E-5 Torr as a specific example, but may be between 2 and 20 Torr. In some examples, the gas source 514 may be configured to pressurize the gas chamber 510 to a low pressure relative to the pressure in the process chamber of the ion implant apparatus.

The temperature probe 500 also includes a temperature sensor 520 and a temperature sensor contact 522, disposed within the gas chamber and adjacent to the top surface of the dielectric plate 502. In some examples, the temperature sensor 520 may be a thermocouple, a resistive temperature device, or another device capable of measuring temperature. The temperature sensor 520 is electrically coupled to a temperature sensor module 550 configured to initiate and/or operate the temperature sensor 520. As will be appreciated, in some examples, the temperature sensor 520 may be small in size and unsuitable for making adequate thermal contact with the substrate 504. As such, the temperature sensor 520 may be attached (e.g., glued, bonded, soldered, or the like) to the temperate sensor contact 522. The temperature sensor contact 522 may be configured to have sufficient surface area so as to create a thermal contact point for the substrate 504. In some examples, the temperature sensor contact 522 may be made from a material having sufficiently high thermal conduction properties (e.g., aluminum, alumina, zirconia, or the like).

Spring 530, 532 and carrier tube 513 are disposed in the gas chamber 510 and biased to press the temperature sensor contact 522 (and consequently, the temperature sensor 520) towards the top surface of the dielectric plate 502 such that when the substrate 504 is placed on the dielectric plate 502 the temperature sensor contact 522 may make contact with the substrate 504. A seal 540 is disposed around opening 512 in the gas chamber 510. The seal 540 is configured such that when the substrate 504 is disposed on the dielectric plate 502, the internal cavity 511 of the gas chamber 510 will be sealed against the lower surface of the substrate 504 via the seal 540. In some examples, the seal 540 may be an O-ring. In further examples, the seal 540 may be made of a material (e.g., silicon, gas filled metal O-ring, or the like) that is able to withstand the temperature to which the dielectric plate 502 may be heated or cooled during operation.

As described above, due to the low pressure region formed in the inner cavity increased thermal condition between the substrate 504 and the temperature sensor 520, via the temperature sensor contact 522, may result.

Turning now to FIG. 6, the temperature probe 600 includes a gas chamber 610 having a gas source 614 configured to pressurize the gas chamber 610 with a gas 616. In some examples, the gas 616 may be a noble gas, such as, for example, argon. With some examples, the gas source 614 may be configured to pressurize the gas chamber 610 to a low pressure (e.g., between 2 and 20 Torr, between 8 and 10 Torr, or the like). In order to maintain this low pressure, the gas source 614 may be configured to use vacuum to reduce the pressure in the gas chamber 610. The pressure within the chamber may be monitored and/or adjusted based on a pressure sensor 618, which may be coupled to the gas source 614. In some examples, the temperature probe 600 may be disposed within a process chamber of an ion implant apparatus. As will be appreciated, during ion implantation, the process chamber is at some level of vacuum. In some examples, the gas source 614 may be configured to pressurize the gas chamber 610 to a low pressure relative to the pressure in the process chamber of the ion implant apparatus.

The temperature probe 600 also includes a temperature sensor 620 and a temperature sensor contact 622, disposed within the gas chamber and adjacent to the top surface of the dielectric plate 602. In some examples, the temperature sensor 620 may be a thermocouple, a resistive temperature device, or another device capable of measuring temperature. The temperature sensor 620 is electrically coupled to a temperature sensor module 650 configured to initiate and/or operate the temperature sensor 620. As will be appreciated, in some examples, the temperature sensor 620 may be small in size and unsuitable for making adequate thermal contact with the substrate 604. As such, the temperature sensor 620 may embedded within the temperate sensor contact 622. The temperature sensor contact 622 may be configured to have sufficient surface area so as to create a thermal contact point for the substrate 604. In some examples, the temperature sensor contact 622 may be made from a material having sufficiently high thermal conduction properties (e.g., aluminum, alumina, zirconia, or the like).

Spring 630, 632 and carrier tube 613 are disposed in the gas chamber 610 and biased to press the temperature sensor contact 622 (and consequently, the temperature sensor 620) towards the top surface of the dielectric plate 602 such that when the substrate 604 is placed on the dielectric plate 502 the temperature sensor contact 622 may make contact with the substrate 604. A seal 640 is disposed around opening 612 in the gas chamber 610. The seal 640 is configured such that when the substrate 604 is disposed on the dielectric plate 602, the internal cavity 611 of the gas chamber 610 will be sealed against the lower surface of the substrate 604 via the seal 640. In some examples, the seal 640 may be an O-ring. In further examples, the seal 640 may be made of a material (e.g., silicon, gas filled metal O-ring, or the like) that is able to withstand the temperature to which the dielectric plate 602 may be heated or cooled during operation.

As described above, due to the low pressure region formed in the inner cavity increased thermal condition between the substrate 604 and the temperature sensor 620, via the temperature sensor contact 622, may result.

It is to be appreciated, that the above described examples are given for illustration only and are not intended to be limiting. Furthermore, the present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. An assembly for measuring the temperature of a substrate during a semiconductor manufacturing processing comprising:
   a temperature sensor for measuring the temperature of a substrate;
   a gas chamber configured to be disposed entirely on a backside of the substrate, the gas chamber having an opening and being disposed around the temperature sensor;
   a seal disposed around the opening in the gas chamber, the seal configured to seal the opening in the gas chamber against the substrate; and
   a spring disposed within the gas chamber, the spring biased to place the temperature sensor in contact with the substrate.

2. The assembly according to claim 1, further comprising a gas source configured to pressurize the gas chamber with a gas.

3. The assembly according to claim 2, wherein the gas source is configured to pressurize the gas chamber to a pressure between 8 and 10 Torr.

4. The assembly according to claim 2, wherein the gas is a noble gas.

5. The assembly according to claim 1, further comprising a temperature sensor contact disposed within the gas chamber, the temperature sensor in thermal contact with the temperature sensor contact and the spring biased to place the temperature sensor contact in contact with the substrate.

6. The assembly according to claim 5, wherein the temperature sensor is disposed on a first surface of the temperature sensor contact, the first surface opposite a second surface of the temperature sensor contact, the second surface configured to make contact with the substrate.

7. The assembly according to claim 6, wherein the temperature sensor is embedded within the temperature sensor contact.

8. The assembly according to claim 1, wherein the seal is an O-ring.

9. A platen for supporting a substrate during a semiconductor manufacturing processing comprising:
   a dielectric plate for supporting a substrate;
   a temperature probe disposed in the dielectric plate for measuring the temperature of the substrate, the temperature probe comprising:
      a temperature sensor for measuring the temperature of a substrate;
      a gas chamber configured to be disposed entirely on a backside of the substrate, the gas chamber having an opening and being disposed around the temperature sensor;
      a seal disposed around the opening in the gas chamber, the seal configured to seal the opening in the gas chamber against the substrate; and
      a spring disposed within the gas chamber, the spring biased to place the temperature sensor in contact with the substrate.

10. The platen according to claim 9, further comprising a gas source configured to pressurize the gas chamber with a gas.

11. The platen according to claim 10, wherein the gas source is configured to pressurize the gas chamber to a pressure between 8 and 10 Torr.

12. The platen according to claim 10, wherein the gas is a noble gas.

13. The platen according to claim 9, further comprising a temperature sensor contact disposed within the gas chamber, the temperature sensor in thermal contact with the temperature sensor contact and the spring biased to place the temperature sensor contact in contact with the substrate.

14. The platen according to claim 13, wherein the temperature sensor is disposed on a first surface of the temperature sensor contact, the first surface opposite a second surface of the temperature sensor contact, the second surface configured to make contact with the substrate.

15. The assembly according to claim 14, wherein the temperature sensor is embedded within the temperature sensor contact.

16. The assembly according to claim 9, wherein the seal is an O-ring.

17. A temperature probe for measuring the temperature of a substrate during a semiconductor manufacturing processing comprising:
   a gas chamber configured to be disposed entirely on a backside of the substrate and defining an opening in a dielectric plate of a platen, the platen configured to support the substrate;
   a temperature sensor for measuring the temperature of the substrate;
   a temperature sensor contact in thermal contact with the temperature sensor;
   a seal disposed around the opening in the gas chamber, the seal configured to seal the opening in the gas chamber against the substrate; and
   a spring disposed within the gas chamber, the spring biased to place the temperature sensor contact in contact with the substrate.

18. The temperature probe according to claim 17, further comprising a gas source configured to pressurize the gas chamber with a gas.

19. The temperature probe according to claim 18, wherein the gas source is configured to pressurize the gas chamber to a pressure between 8 and 10 Torr.

20. The temperature probe according to claim 19, wherein the gas is a noble gas.

* * * * *